United States Patent
Kobayashi et al.

(10) Patent No.: US 7,561,265 B2
(45) Date of Patent: Jul. 14, 2009

(54) OPTICAL MICROSCOPE AND SPECTRUM MEASURING METHOD

(75) Inventors: Minoru Kobayashi, Osaka (JP); Taisuke Ota, Osaka (JP); Takahiro Ode, Osaka (JP)

(73) Assignee: Nanophoton Corp.

( * ) Notice: Subject to any disclaimer, the term of this patent is extended or adjusted under 35 U.S.C. 154(b) by 242 days.

(21) Appl. No.: 11/607,491

(22) Filed: Dec. 1, 2006

(65) Prior Publication Data

US 2007/0132994 A1   Jun. 14, 2007

(30) Foreign Application Priority Data

Dec. 2, 2005 (JP) .............................. 2005-348927
Sep. 13, 2006 (JP) .............................. 2006-247510

(51) Int. Cl.
*G01J 3/30* (2006.01)
(52) U.S. Cl. ........................................... 356/318
(58) Field of Classification Search ................. 356/300, 356/318, 326; 359/368, 17, 202, 656
See application file for complete search history.

(56) References Cited

U.S. PATENT DOCUMENTS

| | | | |
|---|---|---|---|
| 5,442,438 A | 8/1995 | Batchelder et al. | |
| 5,623,342 A | 4/1997 | Baldwin et al. | |
| 6,134,002 A | 10/2000 | Stimson et al. | |
| 6,191,862 B1 * | 2/2001 | Swanson et al. | |
| 7,271,382 B2 * | 9/2007 | Engelmann et al. | 250/234 |
| 2003/0184758 A1 * | 10/2003 | Bjarklev et al. | 356/479 |
| 2005/0264827 A1 * | 12/2005 | Schriever et al. | 356/509 |

FOREIGN PATENT DOCUMENTS

| | | |
|---|---|---|
| JP | 2002-014043 | 1/2002 |
| JP | 2003-344776 | 12/2003 |

OTHER PUBLICATIONS

Drumm, et al., "Microscopic Raman Line-Imaging with Principal Component Analysis," Applied Spectroscopy, 49:1331-1337 (1995).

* cited by examiner

Primary Examiner—Kara E Geisel
Assistant Examiner—Abdullahi Nur
(74) Attorney, Agent, or Firm—Edwards Angell Palmer & Dodge LLP; John J. Penny, Jr.

(57) ABSTRACT

An optical microscope according to a first embodiment of the present invention includes: a laser light source; a Y-directional scanning unit moving the light beam in a Y direction; an objective lens; a X-directional scanning unit moving the light beam in a X direction; a beam splitter provided in an optical path from the Y-directional scanning unit to the sample, and separating outgoing light out of the light beam incident on the sample, which exits from the sample toward the objective lens from the light beam incident on the sample from the laser light source; a spectroscope having an entrance slit extending along the Y direction and spatially dispersing the outgoing light passed through the entrance slit in accordance with a wavelength of the light; and a detector detecting the outgoing light dispersed by the spectroscope.

12 Claims, 7 Drawing Sheets

OPTICAL MICROSCOPE AND SPECTRUM MEASURING METHOD

BACKGROUND OF THE INVENTION

1. Field of the Invention

The present invention relates to an optical microscope and a spectrum measuring method, and more particularly to an optical microscope detecting light of a wavelength different from that of laser light applied to a sample, and a spectrum measuring method.

2. Description of Related Art

Raman spectroscopy is advantageous in that measurement can be executed on samples of any form, for example, a gaseous form, a liquid form, a crystal form, and an amorphous solid form, irrespective of whether temperature is low or high, without using a special measurement atmosphere such as a vacuum atmosphere. In addition, the Raman spectroscopy is advantageous in that pretreatment of the sample can be omitted, and the sample can be measured as it is. Therefore, various measurements have been carried out utilizing these advantages. The application of the Raman spectroscopy enables measurement of molecules without staining, and measurement of impurities in a semiconductor.

To carry out the Raman spectroscopy, a Raman microscope using a spectroscope is disclosed (Japanese Unexamined Patent Publication Nos. 2002-14043 and 2003-344776). The Raman microscope focuses laser light to a sample. Then, the spectroscope diffuses Raman scattered light from the sample to thereby observe Raman spectrum. Further, the Raman microscope executes measurement while moving the sample to thereby measure spatial distribution of an intensity of Raman scattered light with a predetermined wavelength. There is disclosed another Raman microscope that illuminates a sample in a line form by use of a cylindrical lens for shortening measurement period to detect Raman scattered light with a CCD camera (CHARLENE A. DRUMM and another "Microscopic Raman Line-Imaging With Principal Component Analysis" APPLIED SPECTROSCOPY, 1995, vol. 49, No. 9, pp. 1331-1337). This Raman microscope illuminates the sample in the line form and thus, a large area can be illuminated at a time, and a measurement period can be shortened.

However, in the Raman microscope described in CHARLENE A. DRUMM and another "Microscopic Raman Line-Imaging With Principal Component Analysis" APPLIED SPECTROSCOPY, 1995, vol. 49, No. 9, pp. 1331-1337, laser light is changed into linear light by the cylindrical lens, resulting in a problem in that the sample cannot be uniformly illuminated. That is, a distribution of laser beam intensity along beam cross-section is generally similar to the Gaussian function, so its distribution is such that the intensity is highest at the center, and is decreased toward the edge of the laser spot. It is difficult to change the laser light into a linear light beam having uniform intensity. There is another problem in that a speckle noise occurs and hinders high-accuracy observation. That is, if a sample is illuminated by highly coherent laser light, the light is scattered due to dust and the like in an optical path. This scattered light leads to illumination unevenness (speckle noise) in an illuminated portion due to interference. As mentioned above, the conventional Raman microscope has a problem in that high-accuracy measurement is difficult. Further, the conventional Raman microscope faces a problem in that it is difficult to realize both of a shorter measure period and high-accuracy measurement.

SUMMARY OF THE INVENTION

The present invention has been accomplished in view of the above problems, and it is therefore an object of the invention to provide an optical microscope and spectrum measuring method that can execute high-accuracy measurement in a short period.

An optical microscope according to a first aspect of the present invention includes: a laser light source; a first scanner deflecting a light beam from the light source and scanning in the first direction; an objective lens condensing the light beam deflected by the first scanner on the sample; a second scanner changing a position of the light beam scanned by the first scanner relative to the sample and scanning in the second direction; a beam splitter provided in an optical path between the first scanner and the sample and separating an outgoing light from the incident light beam incident on the sample, the outgoing light exits from the sample toward the objective lens with a wavelength different from a wavelength of the incident light beam incident on the sample from the laser light source; a spectroscope having an entrance slit extending along an direction corresponding to the first direction on an incident side of the spectroscope where the outgoing light separated by the beam splitter is focused and incident; and a two-dimensional array photodetector detecting the outgoing light dispersed by the spectroscope. Hence, high-accuracy spectral measurement can be executed in a short period.

According to a second aspect of the invention, the optical microscope further includes: a diaphragm provided for the light beam moved by the first scanner, the diaphragm limiting transmission of the light beam within such a range that a scanning speed of the light beam in the first direction becomes uniform. This enables uniform illumination and more-accurate measurement.

According to a third aspect of the invention, in the optical microscope, an incident plane of the diaphragm on a light beam incidence side is tilted with respect to an optical axis, and a damper absorbing light reflected by the incident plane of the diaphragm is provided. Hence, it is possible to prevent stray light scattered by the diaphragm from entering the detector and execute more-accurate measurement.

According to a fourth aspect of the invention, in the optical microscope, the second scanner is a drive stage, and the sample is placed on the drive stage, and the drive stage is driven to move light beam in the second direction. Hence, an apparatus structure can be simplified.

According to a fifth aspect of the invention, in the optical microscope, an exposure period of the two-dimensional array photodetector is a multiple integral of a scanning period of the first scanner. This enables uniform illumination and more-accurate measurement.

According to a sixth aspect of the invention, the optical microscope further includes: a focal position changing mechanism changing a focal position of the objective lens on the sample along the optical axis. This enables spectral measurement of a three-dimensional area.

According to a seventh aspect of the invention, in the optical microscope, the first scanner moves a focal point on the sample at a speed of 5 mm/sec or more. Hence, it is possible to prevent the sample from being damaged.

According to an eighth aspect of the invention, in the optical microscope, an incident plane of the entrance slit on the light beam incidence side is tiled with respect to the optical axis, and a damper absorbing light reflected by the incident plane of the entrance slit is provided. Hence, it is possible to prevent stray light scattered by the entrance slit from entering the detector and execute more-accurate measurement.

According to a ninth aspect of the invention, in the optical microscope, the beam splitter is a dichroic mirror, and an incident angle of the light beam with respect to the dichroic mirror is 12° or smaller. Hence, it is possible to improve characteristics of the dichroic mirror and execute more-accurate measurement.

According to a tenth aspect of the invention, the optical microscope further includes: two filters provided between the beam splitter and the entrance slit and having a predetermined cutoff wavelength; and a filter driver changing angles of the two filters to the optical axis, wherein outgoing light passed through the two filters enters the entrance slit, and the filter driver drives the two filters such that the two filters are symmetrical with respect to a plane vertical to the optical axis. Hence, even if a cutoff wavelength of the filter is adjusted, the outgoing light is condensed to the entrance slit, so more-accurate measurement can be carried out.

According to an eleventh aspect of the invention, in the optical microscope, an optical element expanding a spot of the light beam on the sample in the first direction is provided between the laser light source and the beam splitter. This makes it possible to prevent the sample from being damaged.

According to a twelfth aspect of the invention, in the optical microscope, a lens condensing the light beam is provided between the beam splitter and the objective lens, and a portion to which the lens condenses the light beam is kept under a low pressure state, or a substance emitting light of a wavelength different from a wavelength of outgoing light from the sample is placed in the portion to which the lens condenses the light beam. Hence, more-accurate measurement can be carried out.

A spectrum measuring method according to a thirteenth aspect of the invention includes: deflecting a light beam from a laser light source and scanning in a first direction; focusing the scanned light beam on a sample; scanning the light beam in a second direction while changing a position of the light beam scanned in the first direction relative to the sample; separating outgoing light out of the light beam incident on the sample before descanning the outgoing light in the first direction, the outgoing light exits from the sample toward an objective lens with a wavelength different from a wavelength of the incident light beam incident on the sample from the laser light source; focusing the outgoing light separated from the incident light on an entrance slit extending along the first direction; spatially dispersing the outgoing light passed through the entrance slit in accordance with a wavelength of the light; and detecting the dispersed outgoing light and measuring a spectrum with a two-dimensional array photodetector having light receiving elements arranged in a direction of the entrance slit and a direction in which the outgoing light is dispersed.

According to the present invention, it is possible to provide an optical microscope and a spectrum measuring method that can execute high-accuracy measurement in a short period.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

The invention will be now described herein with reference to illustrative embodiments. The invention is not limited to the embodiments illustrated for explanatory purposed. For ease of explanation, the following description is given in an abbreviated and simplified manner as appropriate. Those skilled in the art will recognize that components can be readily changed, added, and replaced in the following embodiments within the scope of the invention. Here, the same components are denoted by identical reference numerals throughout the accompanying drawings, and description thereof is omitted if not necessary.

First Embodiment

Figure 1:
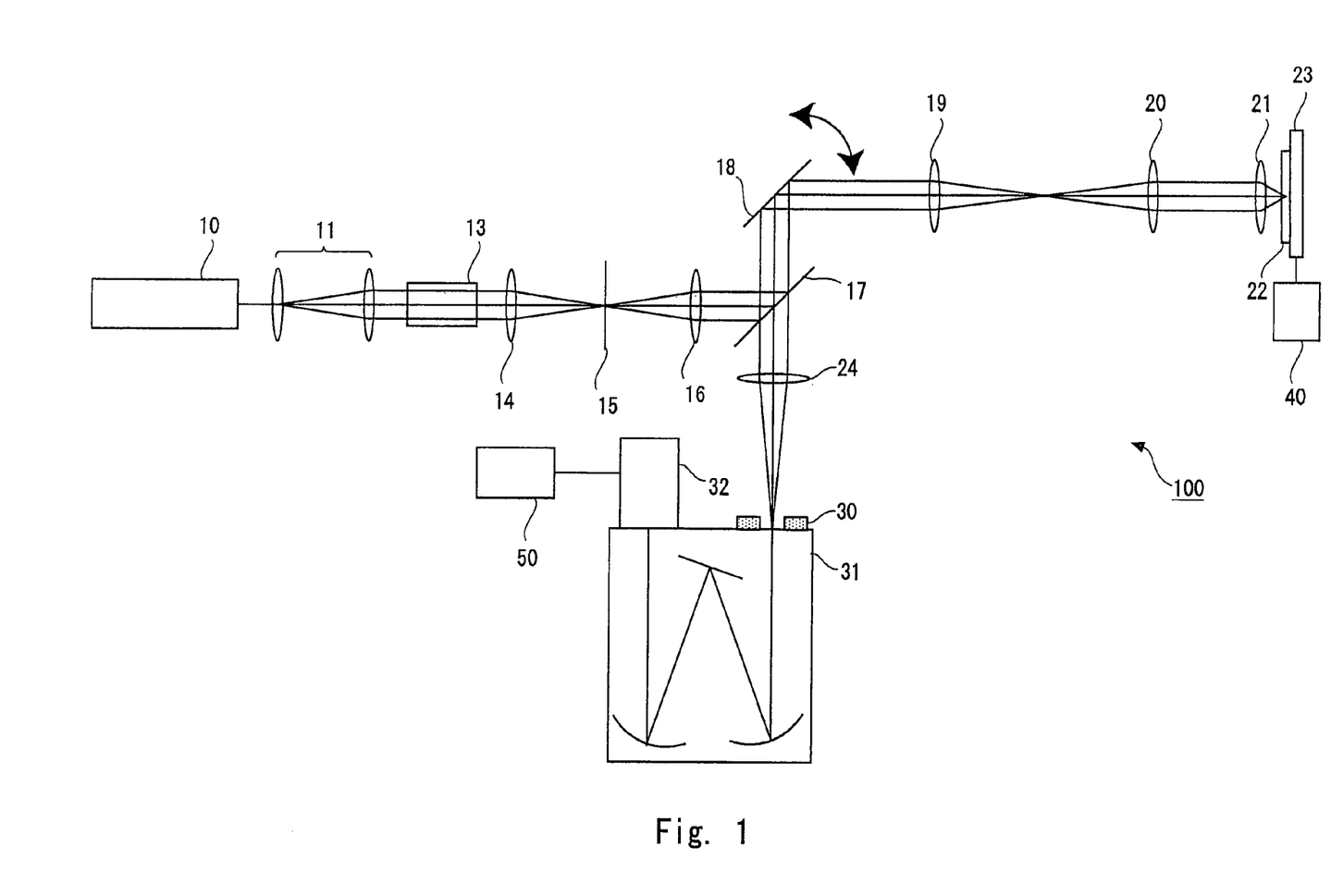
FIG. 1 shows the structure of an optical microscope according to a first embodiment of the present invention.

Referring to FIG. 1, an optical microscope according to a first embodiment of the present invention is described below. FIG. 1 schematically shows the structure of the optical microscope of this embodiment. An optical microscope 100 includes, as the structure for observing a sample 22, a laser light source 10, a beam expander 11, a Y-directional scanning unit 13, a lens 14, a diaphragm 15, a lens 16, a beam splitter 17, an X-directional scanning mirror 18, a lens 19, lens 20, an objective lens 21, a stage 23, a lens 24, a spectroscope 31, a detector 32, a stage driver 40, and a processor 50. The spectroscope 31 is provided with an entrance slit 30 on an incidence side.

The optical microscope 100 is a Raman microscope. The optical microscope allows light beam from the laser light source 10 to enter the sample 22 and detects Raman scattered light from the sample 22 with the detector 32. Further, the spectroscope 31 diffuses the Raman scattered light, and thus Raman spectrum can be observed. In addition, the optical microscope 100 enables scanning in XY-direction (horizontal direction) and Z direction (vertical direction). Hence, a three-dimensional Raman spectrum image can be observed.

First, the overall structure of the optical microscope 100 is described with reference to FIG. 1. The laser light source 10 emits monochromatic laser light. As the laser light source 10, for example, Millennia available from Spectra Physics, inc. can be used. The laser light source 10 is a Nd/YVO4 laser with a laser wavelength of 532 nm, a laser linewidth of 0.24 nm, and the maximum power of 10 W. The laser light source 10 emits laser light of the above laser wavelength.

A light beam from the laser light source 10 is expanded by the beam expander 11 and then enters the Y-directional scanning unit 13. The Y-directional scanning unit 13 is, for example, an acousto-optic device or galvano mirror. The Y-directional scanning unit changes an output angle of the incident light beam to deflect the light beam. As a result, an incident position of the light beam is moved along the Y direction on the sample 22. That is, the Y-directional scanning unit 13 scans the sample with the light beam in the Y direction. Incidentally, a deflection angle of the light beam of the Y-directional scanning unit 13 is controlled in accordance with electric signals from the processor 50. The light beam deflected with the Y-directional scanning unit 13 is refracted by the lens 14 and then enters the diaphragm 15. Incidentally, the lens 14 focuses the light beam on an aperture plane of the diaphragm 15. The diaphragm 15 has, for example, a circular opening to shield outer light beams. That is, the diaphragm 15 limits incidence of light beams outside of the opening.

The light beam passed through the diaphragm 15 is refracted by the lens 16 and enters the beam splitter 17. The beam splitter 17 is, for example, a dichroic mirror, which reflects light of a laser wavelength toward the sample 22. As the dichroic mirror, "edge filter" available from Semrock Inc. can be used. The light reflected by the beam splitter 17 enters the X-directional scanning mirror 18. The X-directional scanning mirror 18 is, for example, a galvano mirror, and an angle of a reflection surface is changed to thereby deflect the light beam. That is, an angle of the reflection surface of the X-directional scanning mirror 18 to the optical axis is changed, so the output angle of the light beam can be changed. As a result, the incident position of the light beam is moved along the X direction on the sample 22. Hence, the light beam can be moved in the X direction. Incidentally, the deflection angle of the light beam in the X-directional scanning mirror 18 is controlled in accordance with electric signals from the processor 50. Here, the X direction and the Y direction are orthogonal to each other. The X-directional scanning mirror 18 and the Y-directional scanning unit 13 scan the sample in the XY-direction, and thus a two-dimensional area can be scanned on the sample 22.

The light beam moved by the X-directional scanning mirror 18 is refracted by the lenses 19 and 20 and then enters the objective lens 21. The objective lens 21 condenses the light beam, and applies the beam onto the sample 22. That is, the objective lens 21 focuses the light beam onto the sample 22 to illuminate the sample 22. As a result, a spot-like area of the sample 22 is illuminated. As the objective lens 21, for example, Apochromat with NA 1.2×60 (available from Nikon) can be used.

The light incident on the sample 22 is partially Raman-scattered. Out of the light incident on the sample 22, light emitted toward the objective lens 21 due to Raman scattering is referred to as "outgoing light". That is, out of the Raman scattered light, light incident on the objective lens 21 is the outgoing light. The Raman-scattered outgoing light is different in wavelength from the incident light. That is, the outgoing light is scattered with a frequency that deviates from an incident light frequency by Raman shift. A spectrum of the outgoing light is Raman spectrum. Therefore, if the spectrum of the outgoing light is measured, the chemical structure and physical state of substances in the sample 22 can be determined. That is, the Raman spectrum includes information about molecular or lattice vibration of a material of the sample 22. Hence, if the outgoing light is diffracted by the spectroscope 31 and then detected, substances in the sample 22 can be identified. Then, a focal position of the incident light is moved in the XYZ-direction to measure the spectrum of the outgoing light from all or a part of the sample 22, and it is possible to execute three-dimensional measurement of the Raman spectrum. Focusing on a specific wavelength out of the measured Raman spectrum, three-dimensional spatial distribution of a specific substance can be measured. To be specific, if the sample 22 is a living cell, spatial distribution of nucleic acids or lipids, or spatial distribution of sucrose or polystyrene sphere can be measured.

Incidentally, the sample 22 is placed on the stage 23. The stage 23 is, for example, XYZ-stage. The stage 23 is driven by the stage driver 40. The stage driver 40 moves the stage 23 in the XY-direction to thereby illuminate a desired portion of the sample 22. Further, the stage driver 40 moves the stage in the Z direction to thereby change a distance between the objective lens 21 and the sample 22. Accordingly, the focal position of the objective lens 21 can be changed along the optical axis direction. The optical microscope 100 of the present invention constitutes a laser confocal microscope as described below. Thus, Z-directional scanning is realized by changing the focal position. That is, if the stage is moved in the Z direction, a tomographic image of the sample 22 can be taken. Further, the Raman scattered light from a predetermined height of the sample 22 can be detected to enable measurement of a three-dimensional Raman spectrum image. The processor 50 inputs a control signal to the stage driver 40 to control the driving of the stage 23.

The outgoing light that is Raman-scattered on the sample 22 placed on the stage 23 and then enters the objective lens 21 propagates through the same optical path as that for the incident light. That is, the outgoing light is refracted by the objective lens 21 and refracted by the lenses 20 and 19 to enter the X-directional scanning mirror 18. The X-directional scanning mirror 18 reflects the incident outgoing light toward the beam splitter 17. At this time, the outgoing light is descanned by the X-directional scanning mirror 18. That is, the outgoing light is reflected by the X-directional scanning mirror 18 and thus propagates in a direction opposite to a traveling direction of the incident light, that is incident on the sample from the laser light source 10, to the X-directional scanning mirror 18. Further, the Rayleigh scattered light from the sample 22 propagates through the same optical path as that for the Raman scattered light.

The outgoing light reflected by the X-directional scanning mirror 18 enters the beam splitter 17. The beam splitter 17 is, for example, a dichroic mirror. The beam splitter 17 splits the outgoing light from the sample 22 and the incident light emitted from the laser light source 10 to the sample 22 based on wavelength difference. That is, the beam splitter 17 is set with its reflection surface inclined with respect to the optical axis of the incident light. The outgoing light from the sample 22 is transmitted through the beam splitter 17, so the optical axis of the outgoing light from the sample 22 is different from the optical axis of the incident light emitted from the laser light source 10 to the sample 22. Hence, the outgoing light from the sample 22 can be separated from the incident light emitted from the laser light source 10 to the sample 22.

Further, the beam splitter 17 as a dichroic mirror has characteristics of reflecting light of a laser wavelength and transmitting the Raman scattered light. Accordingly, Rayleigh scattered light from the sample 22 is reflected by the beam splitter 17, and Raman scattered light is transmitted through the beam splitter 17. That is, since a dichroic mirror is used as the beam splitter 17, the Rayleigh scattered light can be removed by utilizing a wavelength difference between the Rayleigh scattered light and the Raman scattered light. Further, almost all of the laser light from the laser light source 10 is reflected by the beam splitter 17 toward the sample 22. Therefore, a loss of the laser light can be minimized, and only the Raman scattered light can be efficiently detected. Incidentally, reflection characteristics of the dichroic mirror may be determined in accordance with a spectrum range as a measurement target. Here, the beam splitter 17 is provided between the sample 22 and the Y-directional scanning unit 13. Thus, the beam splitter 17 separates the outgoing light before descanning with the Y-directional scanning unit 13 from the light beam from the laser light source 10.

The outgoing light transmitted through the beam splitter 17 is refracted by the lens 24 and then enters the entrance slit 30 provided on the incidence side of the spectroscope 31. At this time, the lens 24 focuses the outgoing light on the entrance slit 30. That is, the lens 24 forms an enlarged image of an illuminated area of the sample 22 on the entrance slit 30. The entrance slit 30 has a linear opening. The opening extends along a direction corresponding to the Y direction. That is, the opening of the entrance slit 30 extends along a direction corresponding to a scanning direction of the Y-directional scanning unit 13 (Y direction) on the sample 22.

The lens 24 refracts the outgoing light and forms an image on the entrance slit 30. Here, the incident light is focused into a spot-like image on the sample 22 surface, so the outgoing light is condensed into a spot shape on the entrance slit 30. The direction in which the opening of the entrance slit 30 extends is matched with the scanning direction of the Y-directional scanning unit 13. The outgoing light enters the beam splitter 17 without being descanned by the Y-directional scanning unit 13. Hence, when the Y-directional scanning unit 13 moves the light beam, a spot position of the light beam is moved on the entrance slit 30 toward the linear opening of the entrance slit 30. The entrance slit 30 is provided such that the light moved on the sample 22 in the Y direction is focused into an image at the opening of the entrance slit 30. In other words, the entrance slit 30 and the sample 22 are in a conjugated relation. Therefore, the Raman microscope is made up of a confocal optical system. That is, the diaphragm 15 and the sample 22 surface are in a conjugated relation, and the sample 22 surface and the entrance slit 30 are in a conjugated relation. The incident light is condensed into a spot shape on the XY-plane of the diaphragm 15 and the sample 22 surface. Then, the scattered outgoing light that exits from the sample 22 is condensed into a spot shape on the entrance slit 30. The entrance slit 30 has an opening extending along the Y direction, and the opening allows only the incident outgoing light to pass therethrough toward the detector 32. An illumination optical system from the laser light source 10 to the sample 22 and an observation optical system from the sample 22 to the detector 32 are configured as the above imaging optical system to thereby complete a confocal Raman microscope. This enables measurement with high resolution in the Z direction. Moving the stage 23 in the Z direction, the Raman scattered light from a desired height of the sample 22 can be separated from the Raman scattered light from the other heights thereof and then detected.

The outgoing light passed through the entrance slit 30 enters a main body of the spectroscope 31. The spectroscope 31 includes a dispersive device such as grating or prism. Thus, the spectroscope 31 spatially disperses the incident light from the entrance slit 30 in accordance with its wavelength. Regarding the spectroscope 31 including a reflective grating, there is additionally provided an optical system inclusive of a concave mirror guiding light from the entrance slit 30 to the dispersive device and a concave mirror guiding the light diffracted by the dispersive device to the detector 32. Needless to say, the structure of the spectroscope 31 is not limited to the above one. The outgoing light is dispersed by the spectroscope 31 toward a direction vertical to the linear opening of the entrance slit 30. That is, the spectroscope 31 executes wavelength dispersion of the outgoing light toward a direction vertical to the linear opening of the entrance slit 30. The outgoing light diffused by the spectroscope 31 enters the detector 32. The detector 32 is an area sensor where light receiving devices are arranged in matrix. More specifically, the detector 32 is a two-dimensional array photodetector having arrayed pixels such as two-dimensional CCD camera.

The detector 32 may be, for example, a cooling CCD. More specifically, 1024×256-pixel thermoelectric cooling CCD (−25° C.) available from Princeton Instruments, inc. can be used as the detector 32. Further, an image intensifier may be attached to the detector 32. Pixels of the detector 32 are arranged along a direction corresponding to the entrance slit 30. Hence, one arrangement direction of the pixels of the detector 32 corresponds to the direction of the entrance slit 30, and the other arrangement direction corresponds to the dispersion direction of the spectroscope 31. The pixel arrangement direction of the detector 32 corresponding to the direction of the entrance slit 30 is the Y direction, and the direction vertical to the entrance slit 30, namely, the direction in which the outgoing light is dispersed by the spectroscope 31 is the X direction.

The detector 32 outputs a detection signal corresponding to the intensity of the outgoing light received by each pixel to the processor 50. The processor 50 is, for example, an information processing unit such as a personal computer (PC). The processor stores the detection signal from the detector 32 in a memory or the like. Then, the processor 50 executes a predetermined processing on the detection result, and displays the resultant on a monitor. Further, the processor 50 controls the scanning with the Y-directional scanning unit 13 and the X-directional scanning mirror 18 and the driving of the stage 23. Here, the X direction of the detector 32 corresponds to the wavelength (frequency) of the outgoing light. That is, a pixel at one end of a pixel line in the X direction detects outgoing light of a long wavelength (low frequency), and a pixel at the other end detects outgoing light of a short wavelength (high frequency). In this way, the distribution of the light intensity in the X direction of the detector 32 is a Raman spectrum distribution.

Figure 2A:
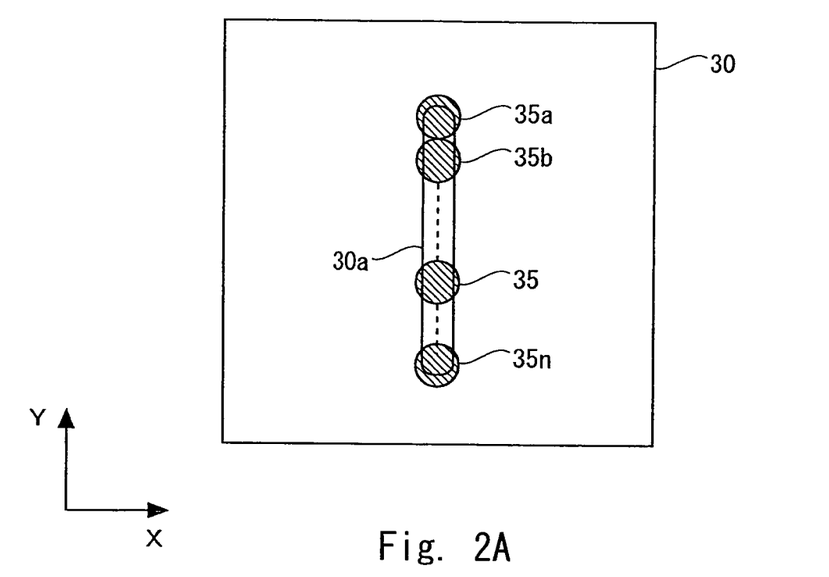
FIGS. 2A and 2B schematically show a spot shape of a light beam on an incident plane of an entrance slit and a light receiving surface of a detector in the optical microscope of the first embodiment.
Figure 2B:
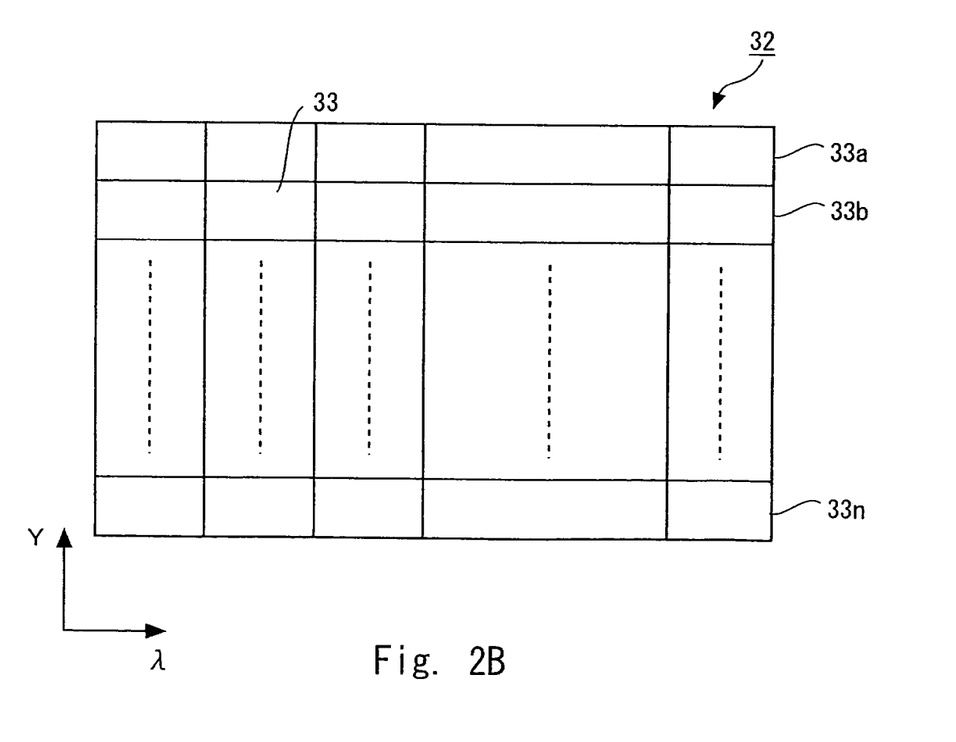

Referring to FIGS. 2A and 2B, a relation between the scanning with the Y-directional scanning unit 13 and pixels of the detector 32 is described next in detail. FIG. 2A schematically shows a spot shape of the light beam on the incident plane of the entrance slit 30. FIG. 2B schematically shows the light receiving surface of the detector 32. As shown in FIG. 2A, the entrance slit 30 has an opening 30a extending along the Y direction. The opening 30a has a length corresponding to the light receiving surface of the detector 32 in the Y direction.

The outgoing light is focused into an image at the entrance slit 30 by the lens 24, so a spot 35 of the light beam is formed in the opening 30a. Here, if the Y-directional scanning unit 13 is driven to move the light beam, the spot 35 of the light beam moves along the opening 30a of the entrance slit 30 on the incident plane of the entrance slit 30. That is, the incident position of the light beam at the incident plane of the entrance slit 30 is moved in the order from the spot 35a, a spot 35b, . . . , and a spot 35n.

FIG. 2B shows the pixels 33 arranged on the light receiving surface of the detector 32. Light receiving devices such as a photodiode are formed in each of the pixels 33. Further, if the detector 32 is a CCD camera, a charge coupled device (CCD) is formed in each pixel. The pixels 33 are arranged in matrix, that is, in vertical and horizontal directions. For example, 1024 pixels are arranged in the horizontal direction, and 256 pixels are arranged in the vertical direction. As shown in FIG. 2B, the pixels 33 on the top line out of the pixels arranged in matrix are referred to as pixels 33a. In addition, the pixels adjacent to the pixels 33a, that is, the pixels 33 of the second line from the top are referred to as pixels 33b, and the pixels 33 on the bottom line are referred to as pixels 33n.

Here, the vertical direction of FIG. 2B (Y direction) corresponds to the opening 30a of the entrance slit 30. Accordingly, if the light beam is incident at the spot 35a, the outgoing light enters the pixels 33a on the top line. At this time, the outgoing light is diffused by the spectroscope 31, so the horizontal direction of the pixels 33a on the top line corresponds to the wavelength (λ) of the outgoing light. That is, the spectroscope 31 disperses the outgoing light passed through the entrance slit 30 toward a direction vertical to the opening 30a of the entrance slit 30. Thus, the outgoing light of a long wavelength is incident at one end of the pixels 33a on the top line, and the outgoing light of a short wavelength is incident at the other end. That is, the outgoing light beams of different wavelengths are incident on the different pixels 33a on the top line, respectively. In this way, spectral information of the Raman scattered light can be expanded in the direction orthogonal to the Y direction of the detector 32 having the pixels arranged in two-dimensional array.

The Y-directional scanning unit 13 moves the incident light in the Y direction, and the light passed through the opening 30a of the entrance slit 30 enters the pixels 33b on the second line from the top in the detector 32. At this time, the incident position of the light beam in the entrance slit 30 is the spot 35b. Further, the illumination position on the sample is moved in the Y direction. The outgoing light passed through the entrance slit 30 is diffracted by the spectroscope 31, so the horizontal direction of the pixels 33b on the second line corresponds to the wavelength (λ) of the outgoing light. As mentioned above, the vertical direction of the arrayed pixels corresponds to a scanning direction of the Y-directional scanning unit 13, and the horizontal direction corresponds to the wavelength of the Raman scattered light.

Here, during a period in which the detector 32 takes an image of one frame, the light beam is scanned in the Y direction one or more times. That is, a scanning period of the Y-directional scanning unit 13 is made shorter than an exposure period of one frame in the detector 32, and the beam is scanned in the Y direction one or more times within the exposure period. Thus, the Raman spectrum of a linear area corresponding to the scanning range can be measured within a period in which the detector 32 takes an image of one frame. That is, the beam is moved throughout the entire scanning area of the Y-directional scanning unit 13 within the exposure period. Thus, the incident position of the light beam is moved on the entrance slit 30 from the spot 35a to the spot 35n. This enables spectral measurement of the Raman scattered light of all of the area corresponding to the opening 30a on the sample 22. That is, an image of a linear area corresponding to the dimension of the opening 30a of the entrance slit 30 can be taken every frame. That is, the Raman spectra at plural points on the sample 22 can be measured through one exposure. Accordingly, it is possible to reduce the number of times charges are transferred in the CCDs of the detector 32 and the number of times data is transferred from the CCDs, and reduce the measurement period. Hence, the Raman spectra at plural points can be measured through data transfer of one frame. This makes it unnecessary to carry out data transfer for each point and shortens the measure period. In this case, since the pixels 33 of the detector 32 are arranged in a to n lines, the Raman spectra at n points on the sample 22 can be measured through one exposure. Therefore, the measurement period can be shortened. Even if the Raman spectrum of, for example, a three-dimensional larger area is measured, the measurement period can be reduced and its practicability can be improved.

As mentioned above, the spectral information of the Raman scattered light can be expanded in the direction orthogonal to the Y direction of the detector 32 having the pixels arranged in two-dimensional array. Then, spectral information of a linear area on the sample can be obtained at a time. Therefore, the Raman spectrum can be measured at high speeds. Further, the sample is illuminated with the spot light, and thus the sample can be uniformly illuminated and the measurement can be carried out with accuracy. That is, illuminating the sample 22 with the spot light prevents the speckle noise. Further, the sample is scanned with the spot light, so variations in luminance of the illumination light from point to point on the sample 22 can be suppressed. Hence, the measurement can be carried out with accuracy in a short period.

In this way, the Raman spectrum of the linear area can be measured. After the completion of the image pickup of one frame, the X-directional scanning mirror 18 shifts the illumination position in the X direction by one illumination area. An image of one frame is taken in a similar manner to measure the Raman spectrum of the linear area. The Raman spectrum of a two-dimensional area on the sample 22 can be measured by repeating the above processing. At this time, the Raman spectrum can be measured every illumination area of the objective lens, so the two-dimensional Raman spectrum image can be measured. That is, the X-directional scanning mirror 18 moves light in the X direction to thereby enable Raman spectroscopy at each point of the sample. That is, the Raman spectrum of the two-dimensional area on the sample 22 can be measured. Further, the stage 23 is moved in the XY-direction, so the Raman spectrum of a wider area can be measured. The stage 23 is moved in the Z direction, and the focal position is moved along the optical axis to thereby enable three-dimensional measurement. That is, after the completion of the spectral measurement of the two-dimensional area, the focal position is shifted in the Z direction, and the Raman spectral measurement of the two-dimensional area is carried out in a similar manner. This enables the three-dimensional measurement of the Raman spectrum.

Figure 3A:
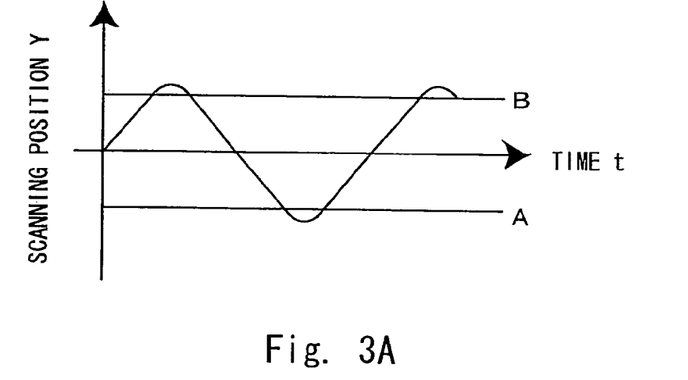
FIGS. 3A and 3B show how an illumination position is changed in the optical microscope of the first embodiment.
Figure 3B:
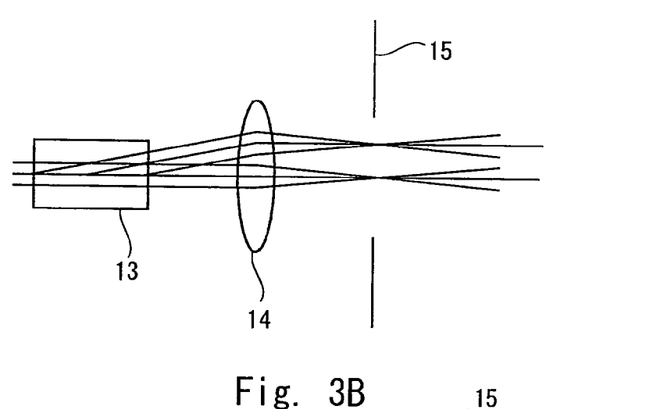

Further, it is preferred that the diaphragm 15 shields the light incident on an area where the scanning speed of the Y-directional scanning unit 13 is nonuniform. Hence, it is possible to uniformly illuminate the linear area. This is described in detail next with reference to FIGS. 3A and 3B. FIG. 3A shows how the illumination position is changed. In FIG. 3A, the horizontal axis represents time, and the vertical axis represents the illumination position on the sample 22. FIG. 3B is a side sectional view schematically showing the structure of the diaphragm 15. As shown in FIG. 3A, the deflection angle is changed with time, and the illumination position is moved toward +Y direction. Then, the scanning direction is changed from +Y direction to −Y direction at one edge of the scanning area of the Y-directional scanning unit 13. That is, after the light reaches the edge of the scanning area of the Y-directional scanning unit 13, the scanning direction is inverted by 180°. After that, the illumination position is changed to −Y direction with time. Then, when the position reaches the other edge of the scanning area, the scanning direction is inverted from −Y direction to +Y direction. The Y-directional scanning unit 13 moves the illumination position in the Y direction by repeating the above processing.

Here, the illumination position is linearly changed in the scanning area except edge portions. That is, the scanning speed is uniform in a range from A to B of FIG. 3A. The scanning direction is inverted in the scanning range outside the lines A and B of FIG. 3A, so the scanning speed is nonuniform. Accordingly, the diaphragm 15 allows the transmission of a light beam within such a range that the scanning speed is uniform, and the illumination position is linearly changed. The diaphragm 15 limits the transmission of a light beam in such a range that the scanning speed is nonuniform. Hence, the illumination position is linearly changed on the sample 22, so the sample can be uniformly illuminated. The structure of the diaphragm 15 can be changed in accordance with the characteristics of the Y-directional scanning unit 13. That is, the diaphragm 15 may be designed to allow the transmission of only light in such an area that the scanning speed of the Y-directional scanning unit 13 is uniform. In other words, the dimension of the opening of the diaphragm 15 corresponds to the positions of A and B of FIG. 3A. The diaphragm 15 disallows the transmission of a light beam in such a range that the scanning speed is nonuniform. Hence, an illumination amount becomes uniform on the sample 22. That is, it is possible to suppress illumination amount variations from one position to another of the sample 22 and to measure the Raman spectrum with accuracy.

Incidentally, it is preferable to execute scanning plural times within the exposure period. That is, the scanning period is preferably an integral multiple of the exposure period. Here, light is moved from one end to the other end of the scanning area throughout one scanning. For example, light is reciprocated n times (n is natural number) in the Y direction within the exposure period. At the beginning and end of the exposure, the illumination light is incident at the same position on the sample 22. Alternatively, the exposure with the detector 32 and the scanning with the Y-directional scanning unit 13 are executed in sync with each other. At the beginning of the exposure, the scanning is started from one end of the scanning range and then stopped at one end or the other end of the scanning range. Hence, an amount of illumination light applied to the linear area becomes uniform within the exposure period. Accordingly, the illumination amount becomes uniform in illumination areas corresponding to each vertical pixel line of the detector 32 to enable more accurate measurement of the Raman spectrum. More specifically, scanning is executed 100 or more times within one exposure. Further, the number of scanning operations within one exposure is increased to thereby suppress an influence of fluctuations in light intensity of a light source and realize more uniform illumination.

Further, the Y-directional scanning unit 13 moves the focal point on the sample at a higher speed than a thermal diffusion speed of the sample to thereby prevent the sample 22 from being damaged due to heat. That is, if the sample 22 is a living body, there arises a problem that the laser light application damages the sample. This problem becomes serious as the laser light intensity increases. More specifically, a scanning frequency of the Y-directional scanning unit 13 in the Y direction is set to 50 Hz, and a scanning range of one scanning process on the sample 22 is set to 50 μm. That is, the scanning speed is set to 5 mm/sec or more. This makes it possible to prevent the sample from being damaged by heat resulting from laser irradiation. Needless to say, the scanning speed is not limited to the above value, and a scanning speed suitable for a sample type may be selected.

Figure 4:
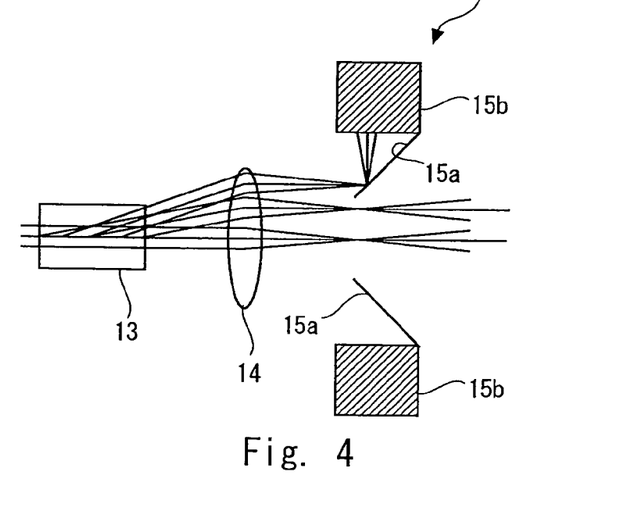
FIG. 4 is a side sectional view showing a preferred structure of a diaphragm used in the optical microscope of the first embodiment.

Referring next to FIG. 4, a preferred shape of the diaphragm 15 is described. FIG. 4 is a side sectional view showing the structure of the diaphragm 15. The diaphragm 15 includes a douser 15a and a damper 15b. As shown in FIG. 4, the douser 15a takes a funnel shape in section as shown in FIG. 4, and has an opening at the center. That is, the surface of the douser 15a where the light beam is incident is tilted with respect to the optical axis. Further, the douser 15a is provided at such angle that the light beam is scattered and reflected on the incident plane in a direction away from the optical axis. Thus, the light that propagates away from the optical axis on the plane of the diaphragm 15 enters the douser 15a. The light incident on the douser 15a is scattered and reflected outwardly by the douser 15a, and then enters the damper 15b. The damper 15b is made of a light absorbing material, and absorbs the light scattered and reflected by the douser 15a. Needless to say, the douser 15a maybe made of a light absorbing material.

The diaphragm 15 is formed into the shape of FIG. 4 to prevent the laser light scattered by the diaphragm 15 from reaching the detector 32. That is, in the Raman spectroscopy, weak light is measured, and therefore, Raman microscope faces a problem in that the laser light scattered by the diaphragm 15 reaches the detector 32 in some cases. If the laser light scattered by the diaphragm 15 is detected by the detector 32, a noise occurs and hinders accurate measurement. However, as shown in FIG. 4, the diaphragm 15 is formed into a funnel shape, so the scattered light is reflected in a direction away from the optical axis. Then, the damper 15b is provided in the path where the light is scattered and reflected, and the scattered light can be absorbed. Thus, it is possible to prevent light incident on a portion outside the opening of the diaphragm 15 from entering the detector 32, and to overcome the problem of the noise. Hence, the Raman spectrum can be more accurately measured.

Incidentally, the structure of the diaphragm 15 is applicable to the entrance slit 30. That is, similar to the structure of FIG. 4, the shape of the opening 30a of the entrance slit 30 may be a funnel shape. The incident plane of the entrance slit 30 is tilted with respect to the optical axis. At this time, the angle of the incident plane is set such that the light is scattered and reflected in a direction away from the optical axis. Similar to the diaphragm 15, the damper is provided in the path where the light is scattered and reflected. This makes it possible to prevent light incident on a portion outside the opening 30a of the entrance slit 30 from entering the detector 32 and thus to prevent noise generation and realize more accurate measurement.

Figure 5:
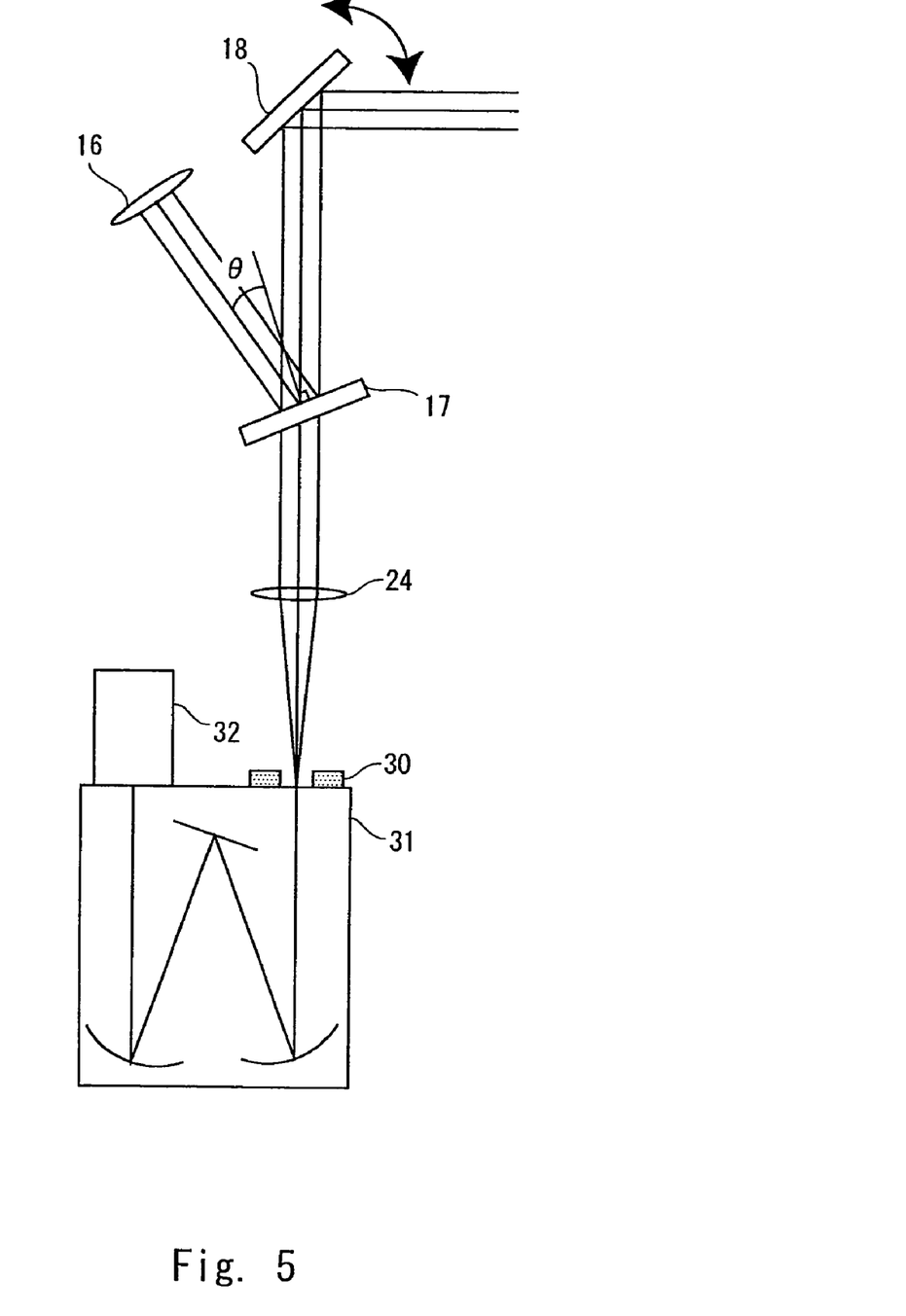
FIG. 5 shows the structure around a dichroic mirror used in the optical microscope of the first embodiment.

Further, it is preferred that the angle of light incident on the dichroic mirror used as the beam splitter 17 be small. Referring to FIG. 5, description thereof is given next. FIG. 5 schematically shows a part of the structure of the optical microscope 100, more specifically, shows the structure of the lens 16, the beam splitter 17, the X-directional scanning mirror 18, the lens 24, the entrance slit 30, the spectroscope 31, and the detector 32. As shown in FIG. 5, an incident angle θ of a light beam from the lens 16 with respect to the reflection surface of the dichroic mirror is made small. Here, the incident angle θ of the light beam is an angle between the principle ray of the light beam and the normal to the reflection surface of the beam splitter. The incident angle θ of the light beam from the lens 16 with respect to the reflection surface of the dichroic mirror is preferably, for example, 12° or smaller, more preferably 10°. Further, it is preferred to set the incident angle θ to 8° or larger such that an optical path of the light beam from the lens 16 does not coincide with that from the lens 17. However, the angle may be 8° or smaller under a predetermined design condition. The characteristics of the dichroic mirror can be improved thereby, and the Rayleigh scattered light can be securely separated from the Raman scattered light. That is, a reflectivity of the dichroic mirror against the Rayleigh scattered light and a transmittance of the dichroic mirror with respect to the Raman scattered light can be improved. Accordingly, the Rayleigh scattered light and the Raman scattered light can be securely separated from each other in accordance with a wavelength difference between the Rayleigh scattered light and the Raman scattered light. Needless to say, in the optical microscope according to the present invention, the incident angle θ of the light beam with respect to the dichroic mirror is not limited to the above value.

Incidentally, in the above description, a dichroic mirror is used as the beam splitter 17, but the present invention is not limited thereto. For example, a half mirror can be used as the beam splitter 17. The half mirror transmits almost half of the incident light and reflects the remaining half. Alternatively, abeam splitter can be used as the beam splitter 17, which transmits a predetermined portion of the incident light and reflects the remaining portion. That is, a beam splitter having a predetermined transmittance and predetermined reflectivity can be used as the beam splitter 17. Incidentally, in the case where the half mirror is used as the beam splitter 17, a dichroic filter or an edge filter is preferably provided to prevent the Rayleigh scattered light from entering the detector 32. That is, it is preferred that a filter having a cutoff wavelength longer than the laser wavelength be used to shield light of the laser wavelength and transmit light of a wavelength longer than the laser wavelength. The filter removes the Rayleigh scattered light based on a wavelength difference between the Rayleigh scattered light and the Raman scattered light. Hence, the Rayleigh scattered light and the Raman scattered light can be separated from each other. It is preferred to provide the filter between the entrance slit 30 and the beam splitter 17. That is, the outgoing light split with the beam splitter 17 enters the filter, and the Raman scattered light is separated from the Rayleigh scattered light. Further, it is preferable to provide the filter near the entrance slit 30. This makes it possible to prevent the laser scattered light from entering the entrance slit 30 as stray light.

Figure 6:
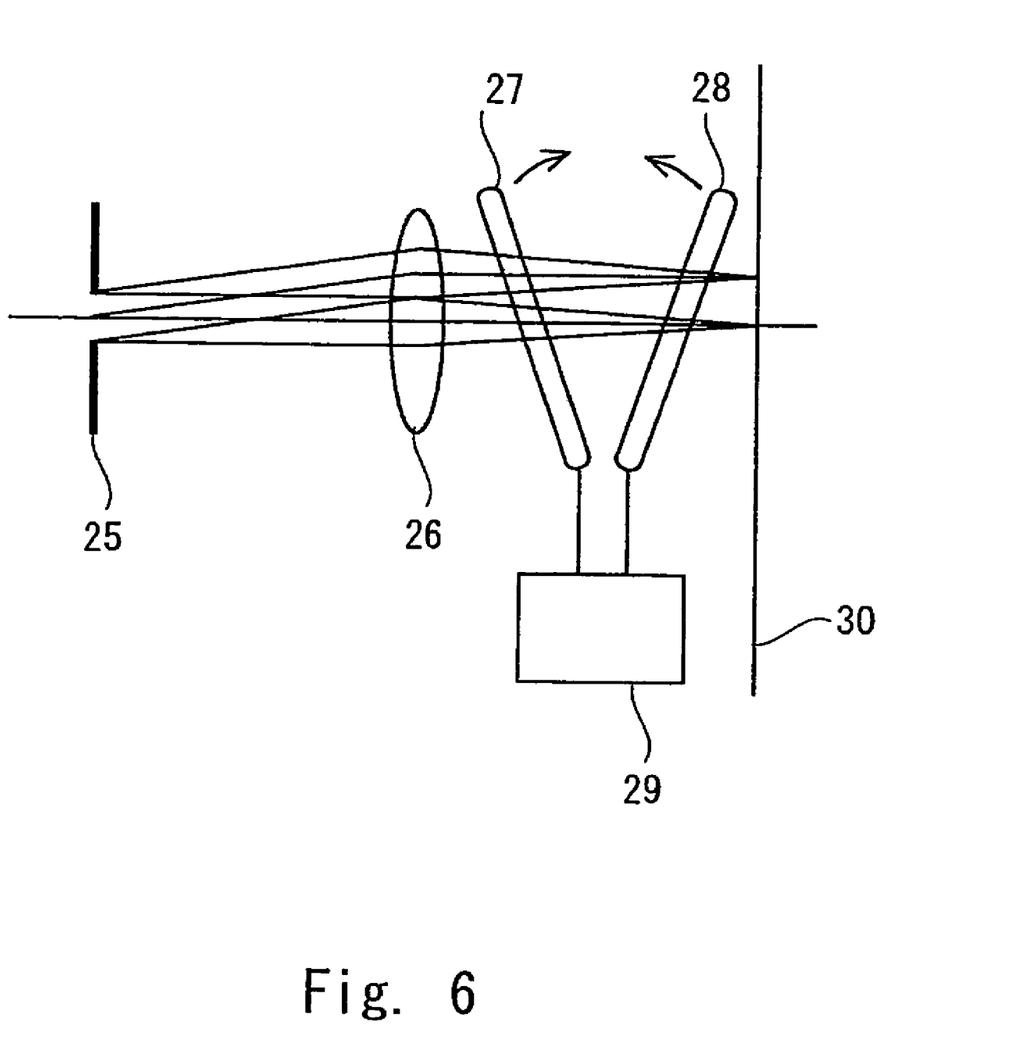
FIG. 6 is a side view showing the structure around a filter used in the optical microscope of the first embodiment.

Further, in the case where the filter is used, the light incident angle to the filter is changed to thereby adjust the cutoff wavelength. Referring to FIG. 6, the arrangement of the filter is described next. FIG. 6 shows a part of the structure of the optical microscope 100, that is, the peripheral structure of the filter. FIG. 6 is a sectional view taken along the Y direction. In FIG. 6, components arranged from the lens 24 to the entrance slit 30 of FIG. 1 are illustrated. That is, the diaphragm 25, the lens 26, and the filters 27 and 28 of FIG. 6 are arranged between the lens 24 and the entrance slit 30.

Here, the filters 27 and 28 have the same characteristics. The filters 27 and 28 have, for example, a disc shape. The two filters 27 and 28 are inclined with respect to each other. That is, the two filters 27 and 28 are arranged symmetrically with respect to a plane vertical to the optical axis. Further, the light incident angle to the filters 27 and 28 is adjusted and the filters 27 and 28 are connected with a filter driver 29. The filter driver 29 changes the angle of the incident plane of the filters 27 and 28 to adjust the light incident angle. Hence, the cutoff wavelength can be adjusted, so light of a wavelength similar to the laser wavelength can be detected or shielded. Further, the filter driver 29 simultaneously drives the filters 27 and 28 such that the filters 27 and 28 are symmetrically arranged. That is, under such a state that the filters 27 and 28 are vertical to the optical axis, the filter driver 29 drives the filters 27 and 28 in opposite directions by the same angle. Hence, even if the angle of the filters is changed, the light is refracted by the filters to prevent deviation of the optical axis, and the Raman scattered light enters the opening of the entrance slit 30. Hence, high-accuracy measurement can be executed with ease. The driving of the filter driver 29 is controlled in accordance with electric signals from the processor 50. Needless to say, it is unnecessary to drive the filters 27 and 28 at the same time, after one filter is driven, the other filter may be driven.

Further, in the optical microscope 100, the outgoing light is detected without being descanned, and the incident position relative to the filters 27 and 28 varies from one scanning position to another in the Y direction. That is, the outgoing light is incident near the center of the filters 27 and 28 at the center of a scanning area, and is incident at a point distant from the center of the filters 27 and 28 at the edge of the scanning area. In this case, if the incident angle to the filters 27 and 28 varies from one scanning position to another, the cutoff wavelength is changed. That is, the cutoff wavelength varies from pixel to pixel of the detector 32. In this case, for example, if light of a wavelength similar to the laser wavelength is detected, there is a fear that the Rayleigh scattered light cannot be well cut off. Referring to FIG. 6, the structure that eliminates the fear is described next.

As shown in FIG. 6, the diaphragm 25 is provided downstream of the lens 24 of FIG. 1. The lens 24 condenses the outgoing light to the diaphragm 25 into an image. The outgoing light passed through the diaphragm 25 enters the lens 26. Here, a focal distance of the lens 26 corresponds to a distance between the diaphragm 25 and the lens 26. That is, the lens 26 is provided away from the diaphragm 25 by the focal distance of the lens 26. In this structure, even if the scanning position is changed, an angle between the principle ray and the filter becomes uniform. Hence, cutoff wavelength variations from one scanning position to another can be suppressed. Even if the filters 27 and 28 are tilted with respect to the optical axis, the cutoff wavelength can become uniform.

Incidentally, the above description is directed to the optical microscope 100 including the Raman microscope, but the present invention is not limited thereto. Any microscope can be used as long as the microscope can detect outgoing light that exits from the sample with a frequency (wavelength) different from the laser wavelength of incident light. For example, a microscope detecting fluorescence excited by excitation light or a microscope detecting infrared adsorption can be used. These microscopes can also measure the spatial distribution of spectra in a short period. Further, the optical microscope 100 is structured such that the X-directional scanning mirror 18 moves light in the X direction, but the present invention is not limited thereto. For example, the light may be moved in the X direction by driving the stage 23. Further, the detector 32 is not limited to the CCD camera. That is, as the detector 32, any storage-type camera can be used insofar as the camera has arrayed detection pixels and has a predetermined exposure period. For example, a CMOS image sensor can be used.

In this embodiment, the incident light is moved at high speeds to measure Raman spectrum at any point on the XY-plane of the sample 22. Hence, the spectrum measurement period can be shortened. That is, it is possible to measure the Raman spectrum in a larger area of the sample 22 in a short period. Therefore, even if an observation area of the sample 22 is increased, it is unnecessary to set a long measurement period. Thus, even if the wavelength resolution of the Raman spectrum is improved or the spectrum of a wider area is measured, the measurement period can be reduced, and the measurement can be practically executed. For example, it is possible to observe the two-dimensional image focusing on Raman scattered light of a desired wavelength (frequency) or to measure Raman spectrum at a predetermined point on the sample 22 with high resolution.

Further, in this embodiment, the Raman microscope is structured as a confocal optical system. Thus, the resolution in the Z direction can be enhanced, so three-dimensional measurement of the Raman spectrum can be carried out. That is, a distance between the objective lens 21 and the sample 22 is changed, and the focal position on the sample 22 can be moved in the Z direction. This enables scanning in XYZ-direction, and the three-dimensional spatial distribution of the Raman spectrum can be measured. In other words, the Raman spectrum can be measured at any point of the 3D sample 22. Even in the case of measuring the three-dimensional spatial distribution of the Raman spectrum, the linear area is measured at a time, so the measurement period can be shortened. Hence, the measurement can be carried out within a practically allowable period. In this way, the above structure can execute XYZ-λ four-dimensional measurement. The four-dimensional measurement enables analysis of various types of spectra. Then, the analysis result is displayed on a display of a processor to thereby realize more sophisticated analysis.

Second Embodiment

Figure 7:
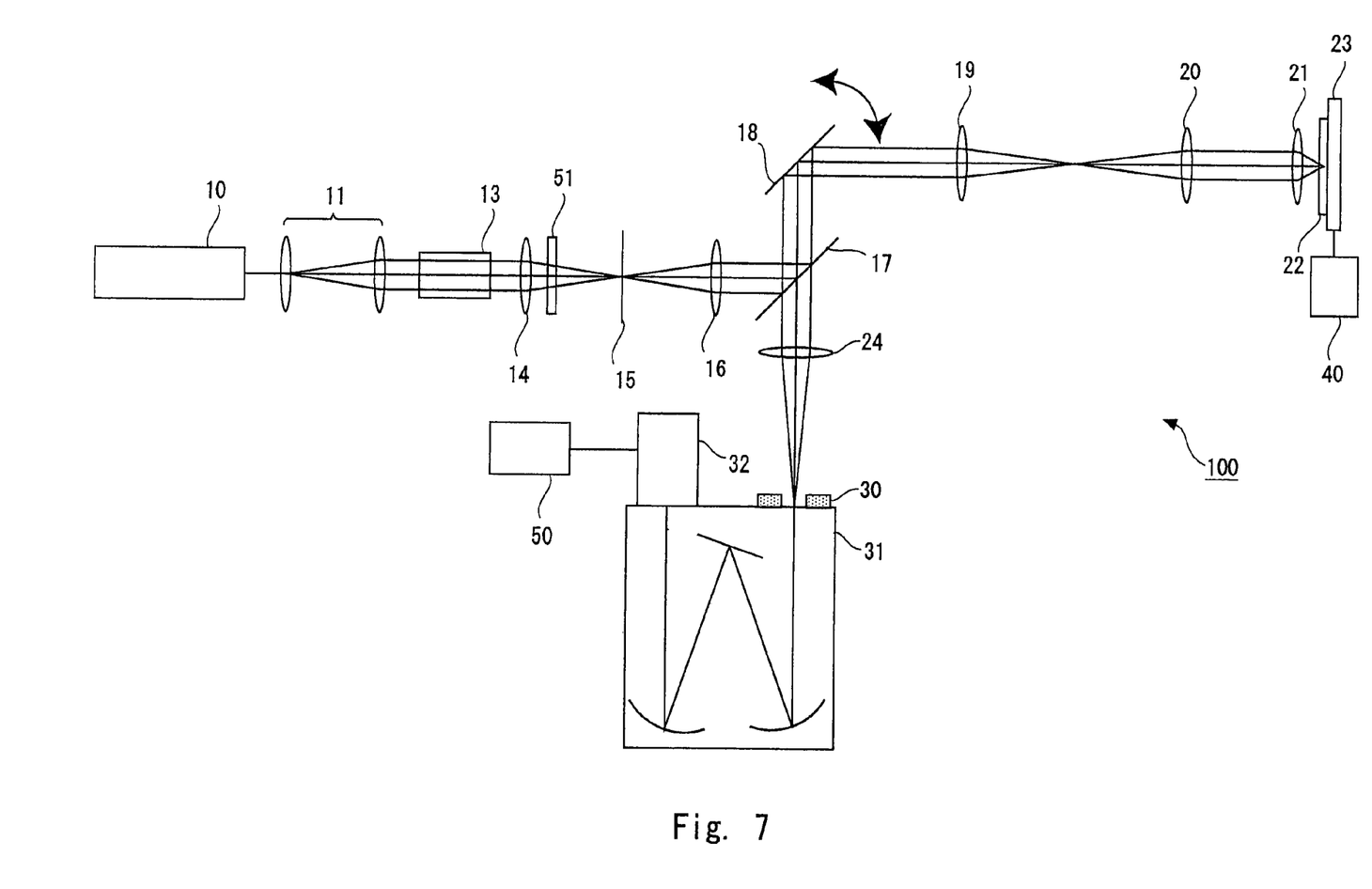
FIG. 7 shows the structure of an optical microscope according to a second embodiment of the present invention.

Referring to FIG. 7, an optical microscope according to a second embodiment of the present invention is described next. FIG. 7 shows the structure of the optical microscope of the second embodiment. Incidentally, the optical microscope of this embodiment includes a cylindrical lens 51 in addition to the components of the optical microscope of the first embodiment. The cylindrical lens 51 is provided downstream of the lens 14. Incidentally, the basic structure of the optical microscope of this embodiment is the same as that of the first embodiment, so its description is omitted here. That is, components other than the cylindrical lens 51 are the same as those of the first embodiment.

As shown in FIG. 7, the cylindrical lens 51 is provided between the lens 14 and the diaphragm 15. The cylindrical lens 51 is a concave lens. The cylindrical lens 51 cancels out light components refracted in the Y direction by the lens 14 as a convex lens. Thus, the beam spot of the laser light is expanded along the Y direction into an elliptical shape on the sample 22. Then, the Y-directional scanning unit 13 moves the light in the Y direction. The laser light the beam spot of which is expanded along the Y direction is moved in the Y direction and applied to the sample 22. The direction in which the cylindrical lens 51 extends the beam matches the scanning direction of the Y-directional scanning unit 13. That is, the Y-directional scanning unit 13 moves the laser light in the direction in which the cylindrical lens 51 extends the beam.

In this way, the cylindrical lens 51 is provided in addition to the Y-directional scanning unit 13, making it possible to prevent any damage on the sample 22. That is, the cylindrical lens 51 expands a spot in the Y direction, so the density of irradiated laser light power can be reduced. Hence, it is possible to suppress damage on the sample 22. Even in such structure, the Y-directional scanning unit 13 moves the laser light in the Y direction, so the spatial distribution of the laser light intensity is averaged. Thus, high-accuracy measurement can be executed. Further, the laser light intensity can be increased, so the measurement period can be further shortened.

Incidentally, in the above description, the cylindrical lens 51 is a concave lens but may be a convex lens. For example, a cylindrical lens as a convex lens may be used in place of the lens 14. Further, the position of the cylindrical lens 51 is not limited to that of FIG. 7. For example, the cylindrical lens 51 can be provided at any position between the laser light source 10 and the beam splitter 17. Hence, the cylindrical lens 51 may be placed upstream of the Y-directional scanning unit 13, not downstream of the Y-directional scanning unit 13. That is, the laser light expanded in the Y direction by the cylindrical lens 51 may be moved by the Y-directional scanning unit 13. In this example, it is preferred to provide the cylindrical lens 51 upstream of the diaphragm 15. That is, the cylindrical lens 51 is positioned between the diaphragm 15 and the laser light source 10. Then, laser light of such an area that a scanning period is nonuniform is shielded by the diaphragm 15. This makes it possible to uniformly irradiate the sample 22 with the laser light and execute high-accuracy measurement. Further, an optical element expanding a beam spot of the laser light is not limited to the cylindrical lens. For example, the Powell lens or holographic element can be used.

Third Embodiment

Figure 8:
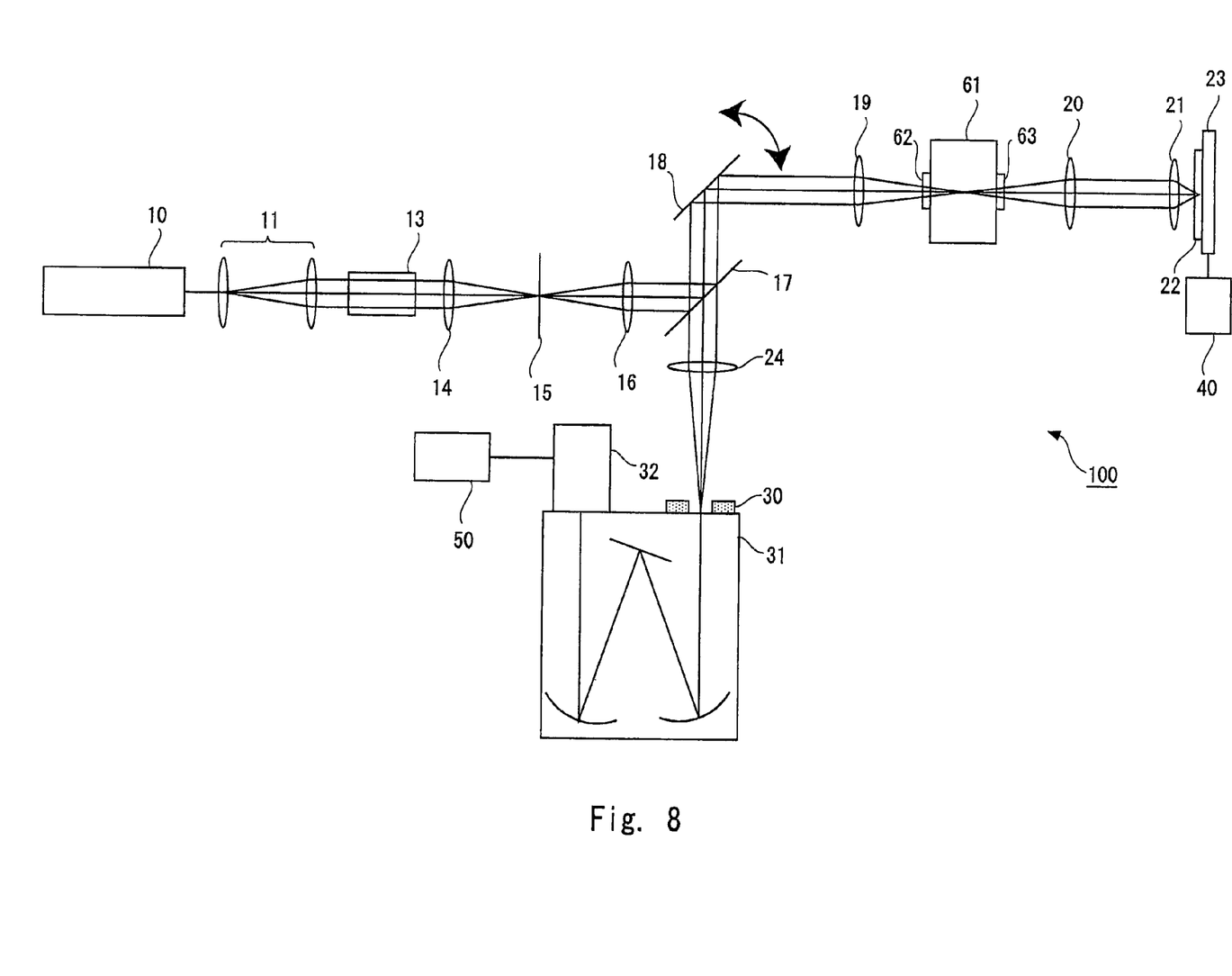
FIG. 8 shows the structure of an optical microscope according to a third embodiment of the present invention.

Referring to FIG. 8, the structure of an optical microscope according to a third embodiment of the present invention is described next. FIG. 8 shows the structure of the optical microscope of the third embodiment. Incidentally, the optical microscope of this embodiment includes a container 61 in addition to the components of the optical microscope of the first embodiment. The container 61 is provided between the lens 19 and the lens 20. Incidentally, the basis structure of the optical microscope of this embodiment is the same as that of the first embodiment, and its description is omitted here. That is, components other than the container 61 are the same as those of the first embodiment.

The container 61 is, for example, a vacuum container. That is, the inside of the container 61 is kept under vacuum. The container 61 is provided at a position where the lens 19 condenses the laser light. That is, the container 61 is provided at an image formation plane of the lens 19. Windows 62 and 63 are provided on opposite sides of the container 61. That is, the window 62 is provided on the laser light incidence side of the container 61, and the window 63 is provided at the exit side from which the laser light is emitted. The windows 62 and 63 are transparent members transmitting the laser light and the Raman scattered light, and are arranged in an optical path. Accordingly, even if the container 61 is placed in the optical path, the laser light and the Raman scattered light are passed through the windows 62 and 63. Hence, the Raman scattered light can be detected. Needless to say, the entire container 61 may be made of a transparent material.

In this example, if the container 61 is not provided, the spatial density of laser light power is high at the focus position of the lens 19, which causes Raman scattered light due to molecules in the air. For example, when laser light is applied to the oxygen or nitrogen, the Raman scattered light is emitted. Accordingly, the Raman scattered light in the air propagates through the optical system and is then detected by the detector 31. In this case, the Raman scattered light in the air becomes a noise. However, as described in this embodiment, a portion to which the lens 19 concentrates the laser light is kept under vacuum, thereby making it possible to prevent the generation of Raman scattered light in the air. In this way, a portion where the spatial density of the laser light power is high is kept under vacuum to thereby enable high-accuracy measurement.

Incidentally, in the above description, the inside of the container 61 is kept under vacuum, but the present invention is not limited thereto. For example, a substance emitting Raman scattered light of a wavelength different from that of the Raman scattered light from the sample 22 is placed in the container 61. This substance is selected in accordance with a material of the sample 22, and maybe a gaseous, liquid, or solid substance. That is, it is possible to place any possible substance but the air in a focus position in accordance with the material of the sample 22. As this substance, a transparent material transmitting the laser light and the Raman scattered light from the sample 22 is used. Needless to say, if a solid substance is set in the focus position of the lens 19, the container 61 can be omitted. Incidentally, the structures of the second and third embodiments may be combined.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical microscope, comprising:
    a laser light source;
    a first scanner deflecting a light beam from the light source and scanning in a first direction;
    an objective lens condensing the light beam deflected by the first scanner on a sample;
    a second scanner changing a position of the light beam scanned by the first scanner relative to the sample and scanning in a second direction;
    a beam splitter provided in an optical path between the first scanner and the sample and separating an outgoing light from the incident light beam incident on the sample, the outgoing light exits from the sample toward the objective lens with a wavelength different from a wavelength of the incident light beam incident on the sample from the laser light source;
    a spectroscope having an entrance slit extending along a direction corresponding to the first direction on an incident side of the spectroscope where the outgoing light separated by the beam splitter is focused and incident; and
    a two-dimensional array photodetector detecting the outgoing light dispersed by the spectroscope,
    wherein an exposure period of the two-dimensional array photodetector is an integral multiple of a scanning period of the first scanner.

2. The optical microscope according to claim 1, further comprising:
    a diaphragm provided for the light beam moved by the first scanner,
    wherein the diaphragm limits transmission of the light beam within a range such that a scanning speed of the light beam in the first direction becomes uniform.

3. The optical microscope according to claim 2, wherein an incident plane of the diaphragm on a light beam incidence side is tilted with respect to an optical axis, and a damper absorbing light reflected by the incident plane of the diaphragm is provided.

4. The optical microscope according to claim 1, wherein the second scanner is a drive stage, and
    the sample is placed on the drive stage, and the drive stage is driven to move light beam in the second direction.

5. The optical microscope according to claim 1, further comprising:
    a focal position changing mechanism changing a focal position of the objective lens on the sample along the optical axis.

6. The optical microscope according to claim 1, wherein the first scanner moves a focal point on the sample at a speed of 5 mm/sec or more.

7. The optical microscope according to claim 1, wherein an incident plane of the entrance slit on the light beam incidence side is tiled with respect to the optical axis, and a damper absorbing light reflected by the incident plane of the entrance slit is provided.

8. The optical microscope according to claim 1, wherein the beam splitter is a dichroic mirror, and
    an incident angle of the light beam with respect to the dichroic mirror is 12° degrees or smaller.

9. An optical microscope, comprising:
    a laser light source;
    a first scanner deflecting a light beam from the light source and scanning in a first direction;
    an objective lens condensing the light beam deflected by the first scanner on a sample;
    a second scanner changing a position of the light beam scanned by the first scanner relative to the sample and scanning in a second direction;
    a beam splitter provided in an optical path between the first scanner and the sample and separating an outgoing light from the incident light beam incident on the sample, the outgoing light exits from the sample toward the objective lens with a wavelength different from a wavelength of the incident light beam incident on the sample from the laser light source;
    a spectroscope having an entrance slit extending along a direction corresponding to the first direction on an incident side of the spectroscope where the outgoing light separated by the beam splitter is focused and incident; and
    a two-dimensional array photodetector detecting the outgoing light dispersed by the spectroscope;
    two filters provided between the beam splitter and the entrance slit and having a predetermined cutoff wavelength; and
    a filter driver changing angles of the two filters to the optical axis,
    wherein the outgoing light passed through the two filters enters the entrance slit, and the filter driver drives the two filters such that the two filters are symmetrical with respect to a plane vertical to the optical axis.

10. The optical microscope according to claim 1, wherein an optical element expanding a spot of the light beam on the sample in the first direction is provided between the laser light source and the beam splitter.

11. An optical microscope, comprising:
    a laser light source;
    a first scanner deflecting a light beam from the light source and scanning in a first direction;
    an objective lens condensing the light beam deflected by the first scanner on a sample;
    a second scanner changing a position of the light beam scanned by the first scanner relative to the sample and scanning in a second direction;
    a beam splitter provided in an optical path between the first scanner and the sample and separating an outgoing light from the incident light beam incident on the sample, the outgoing light exits from the sample toward the objective lens with a wavelength different from a wavelength of the incident light beam incident on the sample from the laser light source;

a spectroscope having an entrance slit extending along a direction corresponding to the first direction on an incident side of the spectroscope where the outgoing light separated by the beam splitter is focused and incident; and a two-dimensional array photodetector detecting the outgoing light dispersed by the spectroscope;

wherein a lens condensing the light beam is provided between the beam splitter and the objective lens, and a portion to which the lens condenses the light beam is kept under a low pressure state, or a substance emitting light of a wavelength band different from a wavelength band of the outgoing light from the sample is placed in the portion to which the lens condenses the light beam.

12. A spectrum measuring method, comprising:

deflecting a light beam from a laser light source and scanning in a first direction;

focusing the scanned light beam on a sample;

scanning the light beam in a second direction while changing a position of the light beam scanned in the first direction relative to the sample;

separating outgoing light out of the light beam incident on the sample before descanning the outgoing light in the first direction, the outgoing light exits from the sample toward an objective lens with a wavelength different from a wavelength of the incident light beam incident on the sample from the laser light source;

focusing the outgoing light separated from the incident light on an entrance slit extending along the first direction;

spatially dispersing the outgoing light passed through the entrance slit in accordance with a wavelength of the light; and detecting the dispersed outgoing light and measuring a spectrum with a two-dimensional array photodetector having light receiving elements arranged in a direction of the entrance slit and a direction in which the outgoing light is dispersed, wherein an exposure period of the two-dimensional array photodetector is an integral multiple of a scanning period of the first scanner.

* * * * *